May 21, 1957  G. E. KELLAR  2,793,002
GATE VALVE CONSTRUCTION
Filed Dec. 26, 1950  6 Sheets-Sheet 1
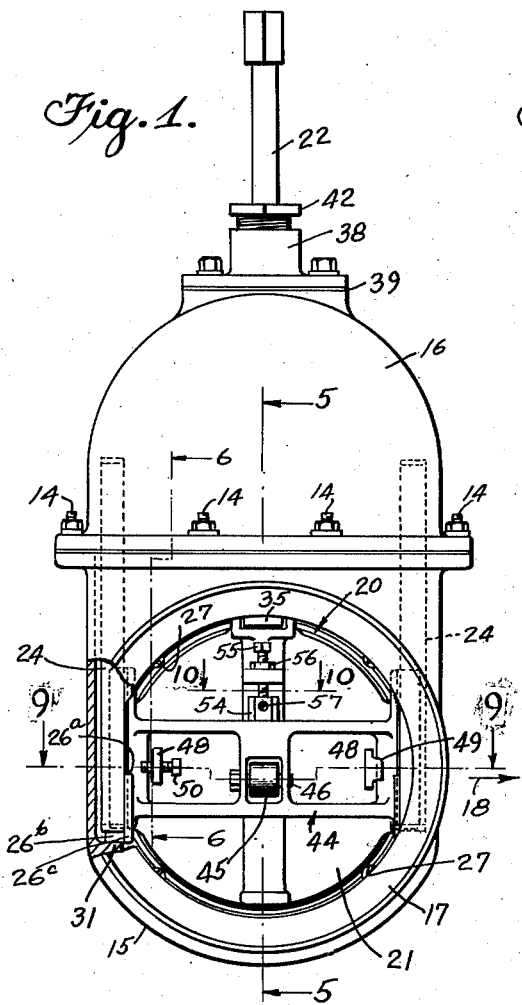
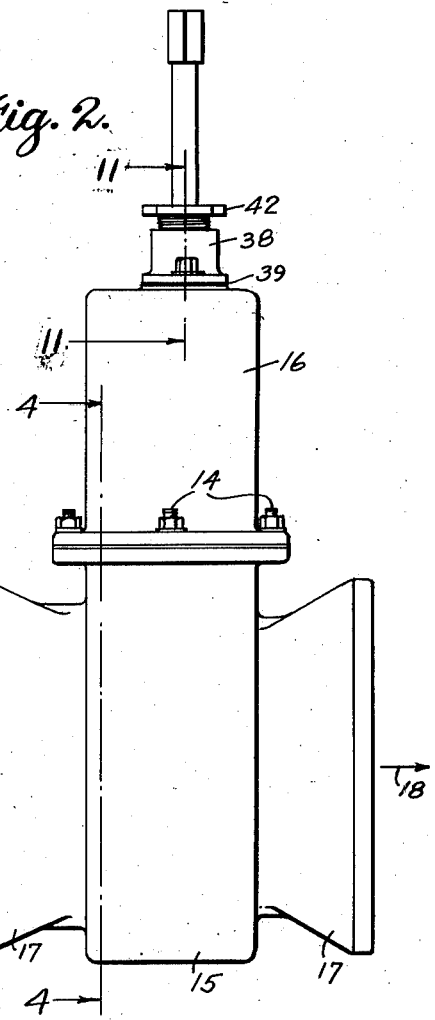
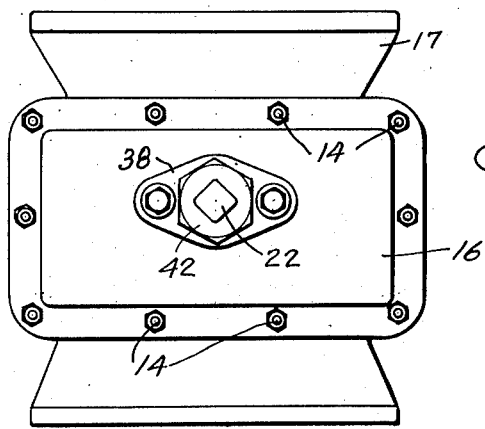
INVENTOR.
George E. Kellar
BY Knight & Rodgers
ATTORNEYS.

May 21, 1957

G. E. KELLAR 2,793,002

GATE VALVE CONSTRUCTION

Filed Dec. 26, 1950

INVENTOR.
George E. Kellar.
BY
Knight & Rodgers
ATTORNEYS.

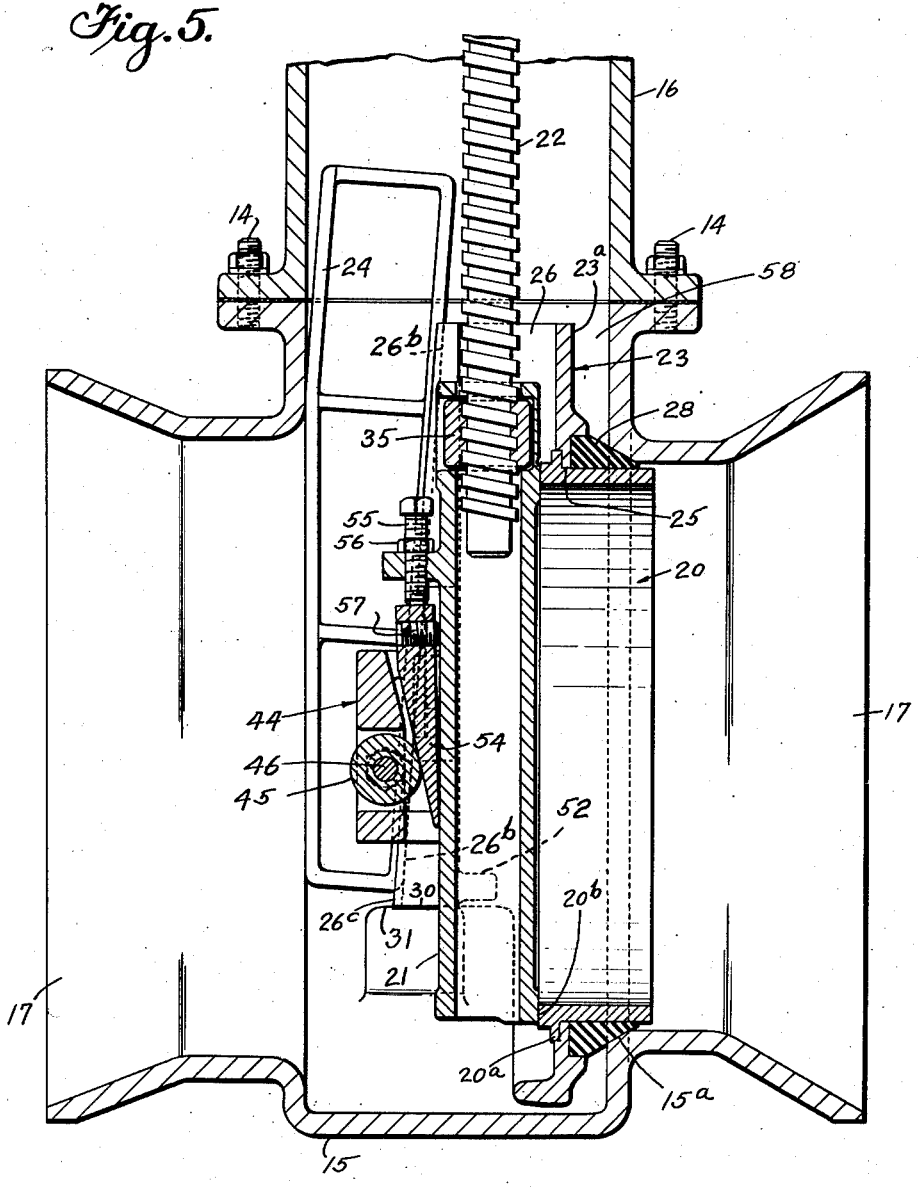

May 21, 1957  G. E. KELLAR  2,793,002
GATE VALVE CONSTRUCTION
Filed Dec. 26, 1950  6 Sheets-Sheet 4
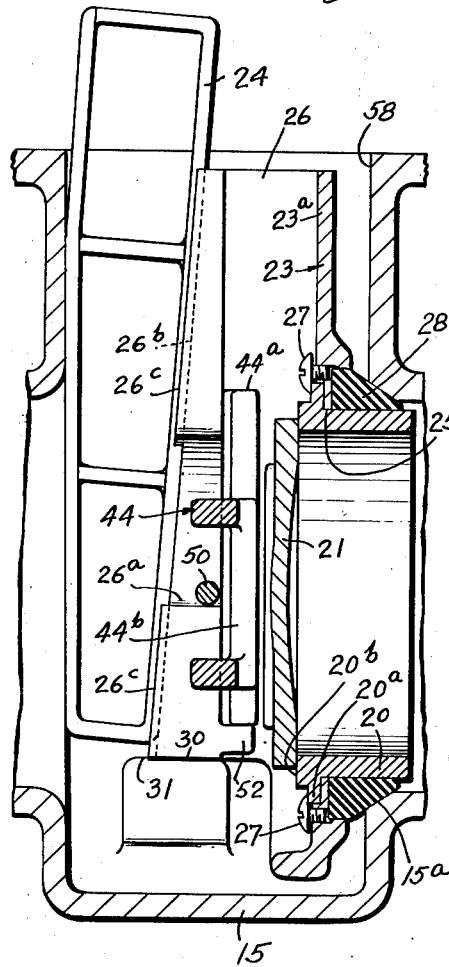
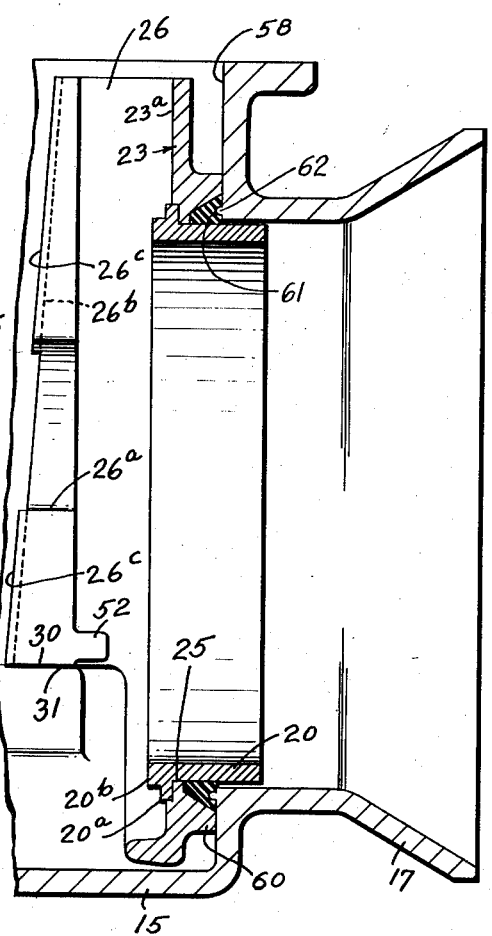
INVENTOR.
George E. Kellar.
BY
Knight + Rodgers
ATTORNEYS.

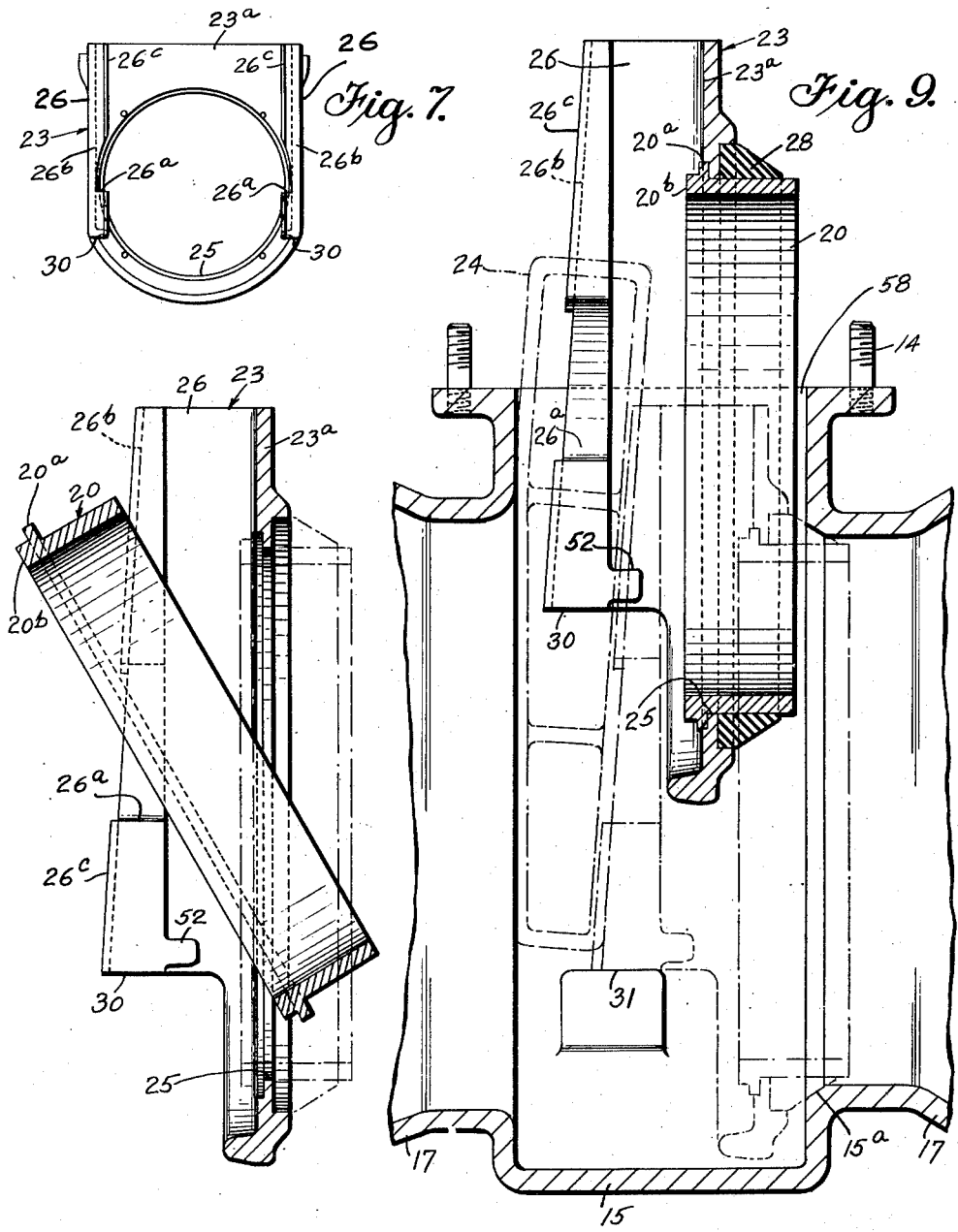

May 21, 1957 G. E. KELLAR 2,793,002
GATE VALVE CONSTRUCTION
Filed Dec. 26, 1950
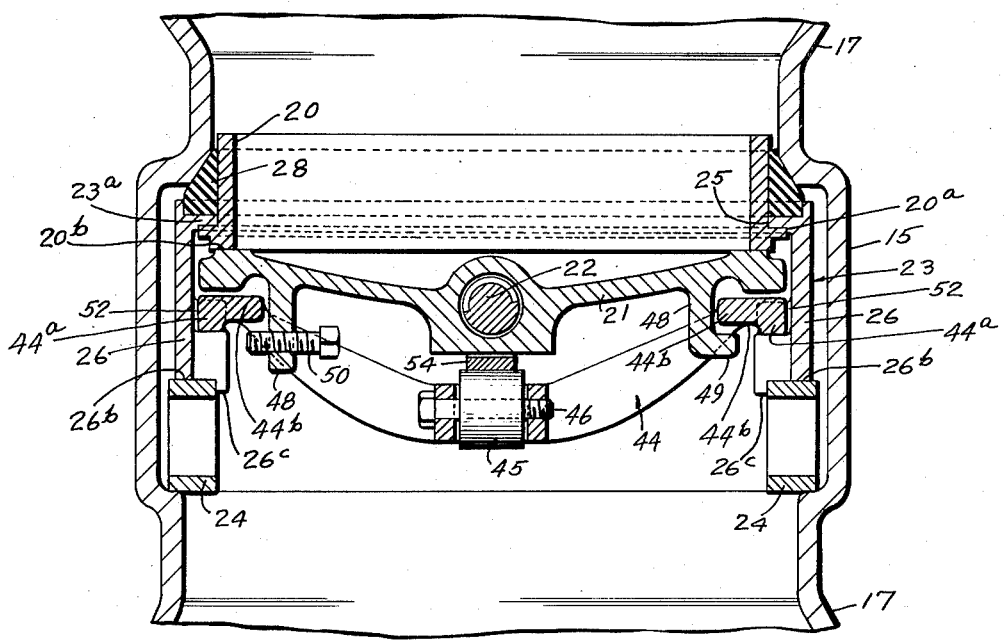
Fig. 10.
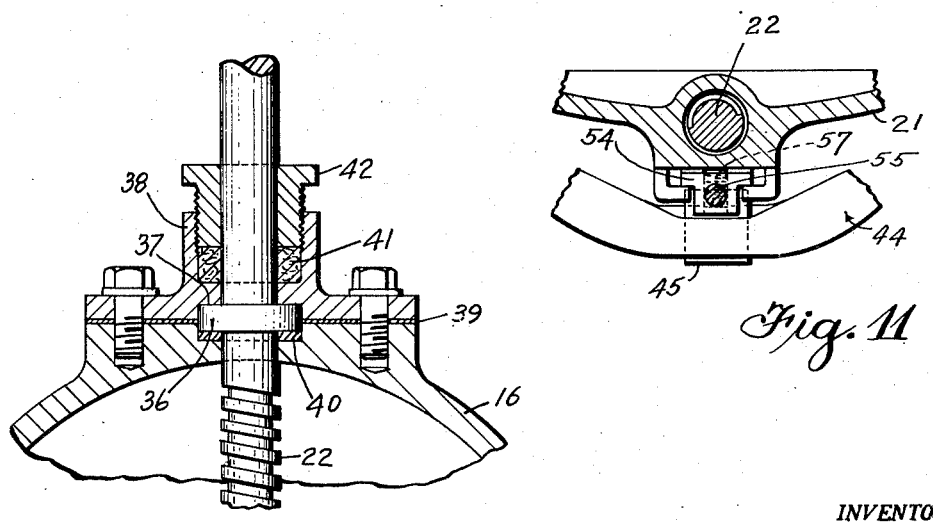
Fig. 12.
Fig. 11
INVENTOR.
George E. Kellar.
BY
Knight & Rodgers
ATTORNEYS.

United States Patent Office 2,793,002
Patented May 21, 1957

2,793,002

GATE VALVE CONSTRUCTION

George E. Kellar, Coachella, Calif., assignor, by mesne assignments, to Hendey Manufacturing Corporation, a corporation of California Application December 26, 1950, Serial No. 202,620

12 Claims. (Cl. 251—204)

The present invention relates generally to valve structures, and more particularly to gate valves of the type designed for connection to concrete conduits or the like and therefore particularly suited for use in irrigation systems, although it will be understood that the invention is not limited to any particular use of the valve or to connection with any particular type of conduit.

Irrigation systems frequently use conduits of substantial diameter and these pipe lines are made of concrete or ceramic material for reasons of economy. However, it is obvious that a valve cannot be made of such material and that it is necessary to design valves of metal which can be used in pipe lines of non-metallic materials. This situation creates a particular problem in that the valve housing is customarily connected to the conduit by a cemented or similar type of connection such that the housing cannot be disconnected from the conduit. Thus it is necessary to leave the housing in place in the pipe line and remove only the interior parts of the valve should it become necessary to repair or recondition the valve.

Thus it becomes a general object of my invention to provide a gate valve construction of the type in which the interior portions of the valve may be removed from the housing quickly and easily, and preferably as a unitary assembly. Likewise, it is desirable that the reverse procedure may be accomplished quickly and easily and that the entire valve assembly can be placed in operative position in the housing accurately and quickly without the use of any special tools.

It is a further object of my invention to provide a valve of this character in which the valve seat cooperating with a movable valve member is easily removable from the valve housing and from other parts of the valve assembly, for repair or replacement of the valve seat.

Another object of the invention is to provide a valve of the character described in which there is reduced to a minimum the surfaces which require careful machining and yet which produces a tight sealing valve.

Another object of the invention is the provision of adjustable mechanism of advantageous design for forcing the movable valve member against its seat with sufficient force to insure maintenance of a water-tight seal or closure between the valve member and the seat under the conditions of metal-to-metal contact.

These and other objects of my invention have been achieved in a valve of novel construction in which the valve housing is in two separable sections, the lower one having two spaced inlet and outlet openings. At one opening is a valve seat unit comprising a frame, a ring providing a seat, and a gasket or other means for forming a fluid-tight seal with the housing. The valve seat unit can be inserted or removed from the housing as a unit through the opening in the lower housing section normally closed by the upper section, permitting repair or replacement of the seat ring and permitting the ring to be of minimum dimensions. A pair of wedges which bear at one side against the housing and at the other against the frame, hold the frame and seat ring in position.

The frame has a pair of parallel guides that direct movement of a movable valve closure member and also a bridge carried by the valve member. The valve member moves transversely of the seat to open or close the valve; and by engaging an anti-friction abutment on the bridge during the terminal part of such movement, a component of motion is induced toward and away from the seat. In this way the valve member is forced into fluid-tight engagement with the seat. The abutment is typically a roller and engages a wedge that is preferably adjustably mounted on the valve member.

The movable valve member and the bridge move together and can also be removed or inserted in the housing as a unit. The means for moving them to open and close the valve is a rotatable stem threaded into a loose nut non-rotatably mounted in the valve disc.

How the above objects and advantages of my invention, as well as others not specifically referred to herein, are attained will be more readily understood by reference to the following description, and to the annexed drawings, in which:

Fig. 1 is a front elevation of a gate valve constructed according to my invention;

Fig. 2 is a side elevation of the valve of Fig. 1;

Fig. 3 is a plan view of the valve in Fig. 1;

Fig. 5 is an enlarged vertical median section on line 5—5 of Fig. 1;

Fig. 6 is a fragmentary vertical section on line 6—6 of Fig. 1;

Fig. 7 is a reduced front elevation of the valve frame alone showing the notches in the guide ways permitting removal of the valve seat ring;

Fig. 8 is an enlarged vertical median section through the frame illustrating how the valve seat ring is tilted to insert it in the frame or remove it therefrom;

Fig. 9 is a vertical median section through the lower section of the valve housing showing how the frame and valve seat ring are introduced into the housing or removed therefrom;

Fig. 10 is a horizontal transverse section of the assembled valve on line 10—10 of Fig. 1;

Fig. 11 is an enlarged fragmentary horizontal section on line 11—11 of Fig. 1;

Fig. 12 is a fragmentary vertical section on line 12—12 of Fig. 2; and

Fig. 13 is a vertical median section through the lower part of the valve housing, similar to Fig. 9, showing a modified form of valve seat unit.

Figure 4:
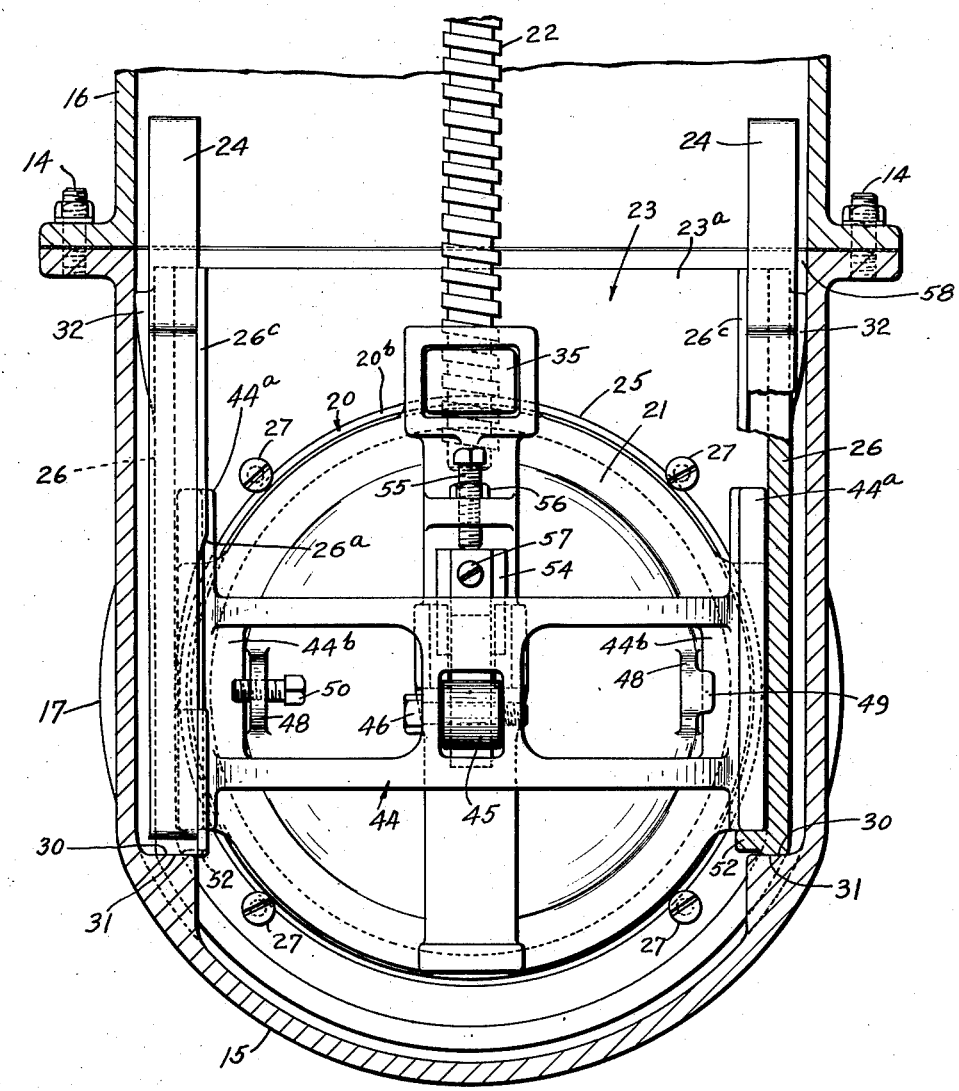
Fig. 4 is an enlarged vertical section taken on line 4—4 of Fig. 2, the upper part of the valve housing being broken away.

As may be seen by reference to Figs. 1, 2 and 3, the housing of the valve is made in two parts which are bolted together. The principal section is lower section 15 to which upper section 16 is fastened by bolts 14, or otherwise fastened in some suitable manner. Lower housing section 15 has two oppositely disposed, bell shaped projections or flanges 17 by which the valve is connected to a suitable conduit. A flange 17 is inserted in the end of a pipe and a water-tight connection made with the pipe by any suitable means as for example sealing the joint with cement, such connections being well known in the art and therefore not shown or described here. Flanges 17 each define an inlet or an outlet opening spaced apart at opposite sides of housing section 15, so that liquid flow through the valve is from one projection 17 to the other one, preferably in the direction of arrow 18 in Fig. 2.

The parts of the valve are contained within the enclosure formed by housing sections 15 and 16. As may be seen particularly in Figs. 4 and 5, the chamber inside the housing has relatively straight, vertical side walls so that the interior chamber is, generally speaking, of uniform cross section in a horizontal plane at any point throughout its height. This is preferred in order that the valve interior parts may be quickly and easily placed in or removed from the housing, as will be explained in greater detail, without in any way breaking or interfering with the connection of flanges 17 to the liquid carrying conduits. Assembly or disassembly of the interior parts of the valve relative to the housing is accomplished by vertical movement of these parts into or out of lower housing section 15 when the upper section 16 is removed.

The principal parts of the interior valve assembly (Fig. 4) are annular valve seat ring 20, valve closure member 21 which is raised and lowered by stem 22, bridge 44 carried on the valve member, and frame 23 upon which the seat ring is mounted. Frame 23 is locked in place inside the housing by two wedges 24.

Frame 23 (Fig. 7) consists of a plate-like center section 23a having a circular opening 25 to receive the valve seat ring 20 as shown in Fig. 5; and a pair of vertically extending guides 26, located one at either side of the frame, which are generally channel shaped in horizontal cross section, as may be seen in Fig. 10. Fig. 7 shows the frame alone as it appears in front elevation when removed from the valve housing. Seat ring 20 is an annular member which is held firmly in place on frame 23 by a number of screws 27 (see Fig. 4), or by any other suitable means. As shown in Fig. 5, valve seat ring 20 is of sufficient axial length to extend into flange 17 for a short distance and is surrounded on its back side by an annular gasket 28, preferably of rubber or similar elastic material, which bears against housing 15 to provide a water-tight joint between the seat ring and the housing. At one end ring 20 opens into the adjoining bell-like flange 17 which provides the outlet to the valve structure; but if desired the ring may be placed at the inlet side of housing 15. Gasket 28 is preferably tapered as shown in Fig. 5 to engage a conical or beveled surface at 15a on the valve housing. A flat planar surface may be provided instead on the housing for engagement with the gasket, but the arrangement shown is preferred because of its self-centering action.

Frame 23, ring 20, and gasket 28 form a complete sub-assembly or unit, herein referred to as the valve seat unit or assembly, that provides not only a replaceable valve seat but also means for forming a fluid-tight seal around the seat with the housing so that fluid flow is controlled by engagement of the valve member with the valve seat.

As may be seen in Fig. 7, each guide 26 has a notch 26a in its front side, the notch being cut back far enough to permit ring 20 to go through the notches, as shown in Fig. 8, to be inserted in opening 25. The overall diameter of the seat ring is slightly greater than the diameter of opening 25 by the dimension of ring flange 20a. Notches 26a are cut back slightly beyond the sides of this central opening. Notching the guides on their front side in this manner is done because the minimum spacing between guides is less than the diameter of ring 20, except where notches 26a allow the ring to pass between them. This construction provides a means for inserting or removing the seat ring from the frame, by tilting it relative to frame 23 and opening 25 to the full line position of Fig. 8. Otherwise the guides must be made larger measured from front to rear or spaced farther apart. Ring 20 could be placed in opening 25 also if the guides were moved farther apart until the space between them is sufficient for the seat ring to pass through without notches at 26a; or if the depth of the channels from front to rear were increased until that dimension is greater than the axial dimension of seat ring 20. However, I prefer to provide notches 26a since in this way the overall dimensions of frame 23 can be smaller for a given size of valve seat 20, with the result that dimensions of the valve housing and other parts can likewise be reduced. The result is a very substantial economy in the amount of metal required and the cost of manufacture.

It is preferable, although not necessary, to provide frame 23 with two pairs of frame positioning shoulders. One such pair of shoulders 30 (Fig. 8) are located at the lower end of guides 26 and face downwardly to engage lugs 31 on the inside of housing 15. Engagement of shoulders 30 with lugs 31 limits the downward travel of the frame inside the housing to a position in which the frame when moved sideways toward the valve outlet opening brings gasket 28 into proper engagement with the valve housing at 15a. This facilitates assembly of the parts, since otherwise the full weight of the valve assembly must be supported during this assembly operation. The upper end of frame 23 is provided at each side with a shoulder 32 (Fig. 4) which slidably engages the vertical inner face of housing 15 as the frame moves downwardly within the housing. The fit between the shoulders and the housing is preferably a loose sliding fit so that the parts may move freely relative to each other while at the same time the valve frame is maintained oriented in the proper position. Shoulders 30 and 32 can be quickly formed to proper size and dimension by grinding, eliminating all machining or grinding of other parts since clearances are more than adequate at all other points.

When in position within the housing, the assembly consisting of the frame, the seat ring, and the valve disc with allied parts, is held in position by two wedges 24 which are interposed between the frame and housing 15. On one side each wedge 24 bears against an inner face of housing section 15 opposing frame 23 and at the other side bears against an outer face 26b of channel members 26, as may be seen best in Figs. 5 and 10. Viewed as in Fig. 7, these two bearing faces 26b are parallel and at opposite margins of frame 23. Wedge members 24 are made in the shape of an open frame with tapered outer sides, the open frame being chosen in order to reduce the weight of these members.

It is preferable to incline the outer faces 26b of the frame to correspond to the taper of wedges 24, although it will be understood that it is possible to taper the face on either the housing or the frame and that it is not necessary to incline both.

When driven down into the position of Fig. 5, the two wedges 24 push against the guide channels on frame 23 to force the valve seat assembly into operational position and compress gasket 28 against the wall of housing 15 in order to form a liquid-tight seal therewith. In addition to forming a liquid-tight seal, the valve seat assembly is locked in place by virtue of the fact that a portion of gasket 28 and seat ring 20 project into the interior of bell-like flange 17, thus locking the valve seat assembly against lateral displacement.

The movable valve member 21 is disc shaped and preferably slightly concave on its inner face as shown in Fig. 10. The disc has a finished, ground annular surface on its inner face which bears against the annular seat 20b on the outer end of ring 20 to form therewith a fluid-tight joint. Valve seat 20b is here shown as lying in a single plane, as this makes for ease and simplicity in machining the engaging surfaces; but the invention is not necessarily limited thereto since a non-planar seat of such short width as to lie essentially in a plane may also be used. As will be seen in Figs. 5 and 6, annular seat 20b projects forwardly from the face of plate section 23a of frame 23 in order that valve disc 21 can engage the annular seat without interference from any other portion of the valve assembly. Valve disc 21 slides up and down in guides 26, vertical movement being imparted to the disc by stem 22.

Stem 22 is threaded, preferably with a coarse, fast thread, and is threaded into nut 35 which is loosely but non-rotatably mounted in the upper portion of valve disc 21. Above the threaded portion, stem 22 has collar 36 which is preferably formed integrally with the rest of the stem, but which alternatively may be pinned or otherwise attached to the stem. As shown in Fig. 12, collar 36 is confined between shoulder or web 37 on cap 38 and a similar shoulder or web on valve housing 16. Cap 38 is bolted to the upper portion 16 of the valve housing; and a gasket 39 is preferably interposed between the cap and housing to obtain a water-tight joint. It has been found preferable to interpose washer 40 between the underside of collar 36 and the bearing surface on housing 16 to reduce friction. In this way stem 22 is held against vertical movement relative to the valve housing so that rotation of the stem causes nut 35 to travel up or down on the threaded portion of the stem, according to direction of rotation of the stem, and carry with it valve member 21. Stem 22 thus provides means for moving the valve member parallel to the plane of seat 20b. A packing gland consisting of suitable packing 41 about stem 22 and compressed by nut 42 threaded onto cap 38, is provided to prevent loss of liquid around the stem.

Also movable with valve member 21 is bridge 44. The ends of this bridge are post-like members 44a which lie in and are guided by engagement with the inner faces of channel guides 26. Between these end members, bridge 44 is an open, rectangular frame which bows outwardly away from valve member 21 and carries at a central position roller 45 rotatably mounted on the bridge by bolt 46, or any other suitable means. As will be more fully explained, roller 45 is an anti-friction abutment to take the reaction to forces bringing the valve disc into seating position. Bridge 44 is loosely connected to valve member 21 in order to move up and down with the valve member but to leave the parts free for limited independent movement relative to each other.

Near each side of the valve member is a thin boss 48. One of the bosses is provided with a fixed pin or integral lug 49 while the other is provided with a corresponding screw 50 or other member which is adjustable. Lug 49 and bolt 50 both project beyond bosses 48 to engage bridge 44 by extending over the web portions 44b at each end post of bridge 44. This relationship of the parts is shown in Figs. 4 and 10 in which it will also be seen that only a small spacing exists between each web 44b and the adjacent boss 48. This spacing reduces the horizontal or lateral motion of the valve member relative to the bridge, while bosses 48 extend between the top and bottom horizontal members of the bridge as shown in Fig. 1 to limit the relative vertical movement of the bridge and valve disc. Lug 49 and bolt 50 limit the relative movement of the bridge and valve member in the remaining horizontal direction (perpendicular to the plane of Fig. 4), but permit the parts to be separated when bolt 50 is retracted. Obviously, lug 49 may be replaced by a bolt 50 or other adjustable member if desired.

On the front side of the valve member is tapered wedge 54 which bears against roller 45, as shown in Figs. 5, 10 and 11. The front face of the wedge engaging abutment roller 45 is inclined to the plane of seat 20b in order to impart to the valve member a component of motion substantially perpendicular to the plane of seat 20b as a consequence of engagement of roller 45 with the wedge. Wedge 54 is mounted upon the valve member for vertical sliding movement relative to the valve, the position of the wedge being determined by adjusting screw 55 which is threaded into the body of valve 21 and is provided with lock nut 56 to hold the screw in any adjusted position. A further and optional adjustment of the wedge may be had by providing at the upper end of the wedge screw 57 which is threaded into the body of the wedge and bears against the face of valve disc 21. By means of screw 57 the inclination of the front face of the wedge bearing against roller 45 may be adjusted as desired. These adjustments are provided for the purpose of controlling the movement of the valve disc toward the seat ring at a given vertical position of the disc.

Having described the construction of my improved valve, I shall now describe briefly the manner of assembling and operating it. Assume that initially all the parts are separate and outside of the valve housing. The first step is to assemble the valve seat ring on the frame. This is accomplished by tilting ring 20 relative to the frame, as shown in full lines in Fig. 8, and sliding the valve seat through notches 26a and between side guides 26 until the seat ring drops down into position in front of circular opening 25 in the valve frame. The seat may then be inserted in this opening to occupy the dot-dash position of Fig. 8. After the valve seat is in place with ring flange 20a bearing against the front side of frame 23, screws 27 are placed and tightened; and then rubber gasket 28 is placed over the ring on that portion which projects rearwardly from the frame.

This valve seat unit or assembly, consisting of seat ring 20 and frame 23, is then lowered into housing section 15 as shown by the full line position of these parts in Fig. 9. Upper section 16 of the housing has been removed to permit this insertion through the opening 58 which is normally closed by housing section 16. This assembly is lowered in the housing until the faces 30 on the bottom of guides 26 engage lugs 31 on the lower housing section, at which time the seat ring is opposite the opening of bell flange 17. Wedges 24 are then inserted between the valve frame and the housing and are driven downwardly. These wedges bear on frame 23 against the front faces 26b of side guides 26; and it is preferable that these guides be provided with vertically extending ribs 26c to hold the wedges against twisting sideways as they are driven downwardly. As the wedges move downwardly, they move the frame and seat ring rearwardly within the valve housing, that is in a direction axial of the opening of flange 17 until the end of seat ring 20 extends within this opening and gasket 28 is firmly against seat 15a on the rear wall of the valve housing.

Next bridge 44 is placed on valve disc 21. This is done by inserting one boss 48 (the left hand one as viewed in Fig. 4) between the top and bottom horizontal members of the bridge and hooking lug 49 over the end web 44b of the bridge. The free end of the bridge is then swung around this connection as a pivot to bring the other lug 48 between the two bridge members into the position shown in Fig. 10, after which bolt 50 may be advanced by turning it until it extends over the adjacent web 44b of the bridge, preventing separation of the bridge and valve disc. These two members are now held together but are able to move a limited amount relative to each other. Valve member 21 and bridge 44 are then lowered together into the channel shaped guides at either side of frame 23 with the end posts of bridge 44 riding against the inner faces of the guides. Downward movement of these parts with respect to frame 23 is stopped by engagement of the bottom ends of the bridge posts 44a with a stop 52 near the lower end of each guide channel 26, as may be seen particularly in Fig. 6. The position of wedge 54 is then adjusted by means of screws 55 and 57 so that the wedge engages and bears against roller 45 during the terminal portion of the downward travel of valve member 21 to force the valve member toward seat ring 20 and into proper sealing engagement with seat 20b on the front face of the ring.

The final step in complete assembly is to put in place the upper section 16 of the housing. The housing section is prepared by inserting stem 22 in the opening in the top of housing section 16 and cap 38 is then bolted to the housing section. Packing 41 is compressed by turning down nut 42 to prevent leakage around the upper end of the valve stem. With cap 38 in place, the housing section is lowered in a way to cause stem 22 to enter nut 35 mounted on the valve member; and the stem is turned to thread the stem through the nut and lower the top housing section onto the lower section. Finally the housing sections are secured together by bolts 14. Now rotation of stem 22 causes nut 35 to travel up or down on the stem and carry with it valve member 21, since the stem is held against vertical movement by engagement of collar 36 with housing 16 and housing cap 38.

Another way to assemble the parts is to thread stem 22 through nut 35 before the valve disc and bridge are lowered into frame 23. The disc and bridge are thus suspended by the stem and the stem and upper housing section are lowered into position at the same time that the valve member and bridge are lowered into guides 26.

A modified form of my invention is shown in Fig. 13, which is the same in all respects as the form described above except for changes in the valve seat unit to effect a different type of seal around the opening to flange 17. In the form shown in Fig. 13, an annular abutment 60 has been added to the back side of the plate portion 23a of frame 23, the abutment 60 having an annular face which lies in a single plane and is adapted to bear against a planar surface or seat on the inside face of housing section 15. Between seat ring 20, abutment 60, and housing 15 is a generally triangular space which is filled by a molded triangular gasket 61, preferably of rubber or other elastic material. Gasket 61 is molded to a size to fill completely the space between these three members, which confine and compress the gasket to hold it in firm sealing engagement with the planar face of housing section 15. The fluid-tight character of the seal may be improved by adding a small raised annular rib 62 around the opening into flange 17, this rib being in a position to indent deformable gasket 61 when the parts are assembled as shown in Fig. 13. The compression of the gasket around the rib assures a fluid-tight seal between the gasket and the valve housing in spite of any minor imperfections that may occur in machining the several parts. The clearance between annular valve seat 20 and the cylindrical wall of flange 17 may be somewhat smaller with this form of seal than with the form shown in Fig. 5, as a minimum clearance is desirable in order to prevent squeezing the gasket into the space between the housing and the valve seat. Ring 20 fits into flange 17 with a loose sliding fit in order to assist in properly confining gasket 62, though no specific clearances are required. Otherwise the dimensions of the parts are unchanged from the form previously described.

Having described a preferred embodiment of my invention and certain modifications thereof, it will be apparent that other changes in the shape and relationship of the various parts may be made by persons skilled in the art without departing from the spirit and scope of my invention. Consequently, it is desired that the foregoing be considered as illustrative of, rather than limitative upon, the invention defined in the appended claims.

I claim:

1. In a valve of the character described, the combination comprising: a housing having spaced inlet and outlet openings through which fluid flows; a valve seat ring at one of said openings providing an annular valve seat; a movable valve member cooperating with said seat to close said one opening to fluid flow; a frame rigidly connected to the valve seat ring and provided at opposite sides with parallel guides directing movement of the movable valve member, said frame being removable from the housing through an opening at one side thereof; means positioning said frame and valve seat ring within the housing, with the valve seat ring substantially in axial alignment with said one opening; means for moving the valve member into and out of engagement with said seat, including an abutment and a wedge carried on the valve member and engageable with the abutment to move the valve member against the valve seat; and a bridge carrying the abutment and loosely connected to the valve member for limited movement relative thereto, said bridge at its ends engaging the guides on the frame.

2. A valve as in claim 1, in which the means positioning the frame and valve seat ring within the housing comprises a pair of wedge members, one positioned between each guide on the frame and the housing to hold the valve seat ring in place at said one opening.

3. In a valve of the character described, the combination comprising: a housing comprising a lower section and a removable upper section, the lower section having spaced inlet and outlet openings through which fluid flows; a valve seat ring at one of said openings providing a valve seat and having annular sealing means; a frame rigidly connected to the valve seat ring and provided at each of two opposite margins with a bearing face, said frame being removable from the lower housing section through an opening at one side thereof normally closed by said upper section; and wedge means for moving the frame into position to maintain the valve seat ring at said one opening, with said sealing means in engagement with the interior surface of the lower housing section around said one opening, said wedge means comprising a pair of wedges each engaging one of the bearing faces on the frame and also an opposing face on the interior of the housing.

4. In a valve of the character described, the combination comprising: a housing having spaced inlet and outlet openings through which fluid flows; a valve seat ring at one of said openings providing a valve seat; a movable valve member cooperating with said seat to close said one opening to fluid flow; an abutment; a wedge carried on the valve member for movement therewith and having an inclined surface engageable with the abutment to move the valve member against the valve seat; means mounting said wedge on the valve member for bodily movement relative thereto to adjust the movement imparted to the valve member by engagement of said wedge with said abutment; and a threaded stem extending into the housing and engaging thread means carried by the valve member independently of said wedge to move the valve member parallel to the plane of said opening upon rotation of the stem and thereby move the wedge relative to the abutment.

5. In a valve of the character described, the combination comprising: a housing having spaced inlet and outlet openings through which fluid flows; a valve seat ring at one of said openings having an annular seat extending circumferentially about the axis of said one opening; a movable valve member cooperating with said seat to close said one opening to fluid flow; means mounting said valve member for movement in one direction substantially perpendicular to the axis of said one opening and for movement in another direction substantially parallel to said axis to bring the valve member into sealing engagement with the valve seat; means for moving the valve member in said one direction to a position opposite the valve seat; a bridge carried by the valve member and loosely connected thereto for limited movement relative to said valve member; an anti-friction abutment carried on said bridge; stop means mounted in fixed position within said housing for engagement by said bridge to limit movement of the bridge in said one direction; and a bearing member on said valve member having a surface inclined to said plane and engageable with the abutment during the terminal portion of the movement of the valve member in said one direction after engagement of said bridge with said stop means, to impart to the valve member a component of motion in said other direction and force it into sealing engagement with the valve seat.

6. In a valve of the character described, the combination as set forth in claim 5, and also comprising means mounting the bearing member on the valve member for bodily movement relative thereto to adjust the movement imparted to the valve member by engagement of said bearing member with said abutment.

7. In a gate valve, the combination comprising: a housing having spaced inlet and outlet openings through which fluid flows; a valve seat unit removably mounted within said housing at a position adjacent one of said openings and having an opening through said valve seat unit substantially in axial alinement with said one opening of the housing; said valve seat unit having at one side thereof an annular seat extending circumferentially about the axis of the opening in the valve seat unit and facing in a direction away from said one opening of the housing; annular sealing means between the other side of said valve seat unit and said housing, extending circumferentially about said axis; said valve seat unit also having a pair of bearing faces at said one side thereof, disposed at opposite sides of said axis and facing in a direction away from said one opening of the housing; and a pair of wedges each bearing against one of the bearing faces of the valve seat unit and against an opposing surface within the housing to force the valve seat unit in a direction toward and axially of said one opening of the housing and thereby compress said sealing means to form a fluid tight seal between the valve seat unit and the housing around said one opening.

8. In a gate valve, the combination as set forth in claim 7, in which said sealing means comprises an elastic gasket and said housing has a bevelled surface engaging said gasket.

9. In a gate valve, the combination as set forth in claim 7, in which said sealing means comprises an elastic gasket and the valve seat unit has a bevelled surface engaging said gasket.

10. In a gate valve, the combination as set forth in claim 7, in which the valve seat unit comprises a frame and a valve seat ring mounted on the frame and providing said valve seat, and the sealing means comprises a deformable sealing member engaging the frame and the valve seat ring, the frame having a rigid abutment which at least in part confines the sealing member and engages the housing along with the sealing member.

11. In a gate valve, the combination as set forth in claim 10, in which the valve seat ring extends into said one opening for a short distance with a loose sliding fit to assist in confining the deformable sealing member.

12. In a valve of the character described, the combination comprising: a frame member having a circular opening and two spaced parallel channel-shaped guides located one at each of two opposite sides of the opening, said guides having portions projecting inwardly toward each other with the inner edge of each projecting portion recessed to provide opposed notches therein; and an annular valve seat ring insertable in the circular opening, the minimum spacing between the inwardly projecting portions of said guides being less than the diameter of the seat ring except at said notches and the spacing between the face of said opening and the inwardly projecting portions of the guides being less than the axial thickness of said seat ring; and said notches being located opposite said opening to permit the ring to be inserted into said opening when passed through the notches while inclined to the plane of the opening.

References Cited in the file of this patent

UNITED STATES PATENTS

| 154,121 | Brown | Aug. 18, 1874 |
| 653,600 | Wiley | July 10, 1900 |
| 1,752,456 | Pallatt | Apr. 1, 1930 |
| 1,830,999 | Harwood | Nov. 10, 1931 |
| 1,999,505 | Klass | Apr. 30, 1935 |
| 2,190,147 | Ciccio | Feb. 13, 1940 |

FOREIGN PATENTS

| 8,923 | Great Britain | of 1910 |